(12) United States Patent
Hashimoto et al.

(10) Patent No.: US 10,199,613 B2
(45) Date of Patent: Feb. 5, 2019

(54) PACKAGING MATERIAL FOR BATTERIES

(71) Applicant: DAI NIPPON PRINTING CO., LTD., Tokyo (JP)

(72) Inventors: Yohei Hashimoto, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 185 days.

(21) Appl. No.: 15/129,615

(22) PCT Filed: Mar. 31, 2015

(86) PCT No.: PCT/JP2015/060077
§ 371 (c)(1),
(2) Date: Sep. 27, 2016

(87) PCT Pub. No.: WO2015/152216
PCT Pub. Date: Oct. 8, 2015

(65) Prior Publication Data
US 2017/0149025 A1    May 25, 2017

(30) Foreign Application Priority Data

Mar. 31, 2014    (JP) .................................. 2014-071370
Mar. 31, 2014    (JP) .................................. 2014-071371

(51) Int. Cl.
*H01M 2/02*    (2006.01)
*B32B 7/12*    (2006.01)
(Continued)

(52) U.S. Cl.
CPC ............. *H01M 2/0287* (2013.01); *B32B 7/12* (2013.01); *B32B 15/04* (2013.01); *B32B 15/08* (2013.01);
(Continued)

(58) Field of Classification Search
CPC ..... H01M 2/0287; H01M 2/08; B32B 15/085; B32B 7/12; B32B 15/20
See application file for complete search history.

(56) References Cited

U.S. PATENT DOCUMENTS 6,004,693 A    12/1999    Fukuda et al.
7,048,822 B2    5/2006    Yamashita et al.
(Continued)

FOREIGN PATENT DOCUMENTS

JP    H09-288996 A    11/1997
JP    H10-261386 A    9/1998
(Continued)

OTHER PUBLICATIONS

Jun. 30, 2015 International Search Report issued in International Patent Application No. PCT/JP2015/060077.

*Primary Examiner* — Stewart A Fraser
(74) *Attorney, Agent, or Firm* — Oliff PLC

(57) ABSTRACT

The purpose of the first invention is to provide a packaging material for batteries, which has excellent resistance to electrolyte solution. A packaging material for batteries, which is composed of a laminate that sequentially comprises at least a base layer, an adhesive layer, a metal foil layer and a sealant layer in this order. This packaging material for batteries is able to have excellent resistance to electrolyte solution by disposing an acid-reactive resin layer containing an acid curable resin between the adhesive layer and the metal foil layer and/or between the metal foil layer and the sealant layer.

10 Claims, 1 Drawing Sheet

(51) Int. Cl.
  *B32B 15/08* (2006.01)
  *B32B 15/20* (2006.01)
  *B32B 27/16* (2006.01)
  *B32B 15/085* (2006.01)
  *H01M 2/08* (2006.01)
  *B32B 15/04* (2006.01)
  *B32B 27/08* (2006.01)
  *B32B 27/26* (2006.01)
  *B32B 27/32* (2006.01)
  *B32B 27/34* (2006.01)
  *B32B 27/42* (2006.01)

(52) U.S. Cl.
  CPC ............ *B32B 15/085* (2013.01); *B32B 15/20* (2013.01); *B32B 27/08* (2013.01); *B32B 27/16* (2013.01); *B32B 27/26* (2013.01); *B32B 27/32* (2013.01); *B32B 27/34* (2013.01); *B32B 27/42* (2013.01); *H01M 2/0277* (2013.01); *H01M 2/0285* (2013.01); *H01M 2/08* (2013.01); B32B 2255/06 (2013.01); B32B 2255/20 (2013.01); B32B 2255/26 (2013.01); B32B 2270/00 (2013.01); B32B 2307/31 (2013.01); B32B 2307/518 (2013.01); B32B 2307/714 (2013.01); B32B 2457/10 (2013.01); B32B 2553/00 (2013.01)

(56) References Cited

U.S. PATENT DOCUMENTS

| | | | |
|---|---|---|---|
| 8,067,113 | B2 | 11/2011 | Yamashita et al. |
| 2012/0034477 | A1 | 2/2012 | Yamashita et al. |
| 2012/0258353 | A1 | 10/2012 | Yamashita et al. |
| 2013/0130007 | A1* | 5/2013 | Orihara ............... H01G 11/74 428/218 |
| 2014/0335403 | A1 | 11/2014 | Akita et al. |

FOREIGN PATENT DOCUMENTS

| | | |
|---|---|---|
| JP | 2000-268787 A | 9/2000 |
| JP | 2001-202927 A | 7/2001 |
| WO | 2013/069730 A1 | 5/2013 |

* cited by examiner

PACKAGING MATERIAL FOR BATTERIES

TECHNICAL FIELD

The present invention relates to a battery packaging material having excellent electrolytic solution resistance. Further, the present invention relates to a battery packaging material having not only excellent electrolytic solution resistance but also an excellent insulation quality.

BACKGROUND ART

Various types of batteries have been developed heretofore, and in every battery, a packaging material is an essential member for sealing battery elements such as an electrode and an electrolyte. Metallic packaging materials have been often used heretofore for battery packaging, but in recent years, batteries have been required to be diversified in shape, and desired to be thinner and lighter as performance of electric cars, hybrid electric cars, personal computers, cameras, mobile phones and so on has been enhanced. However, metallic battery packaging materials that have often been heretofore used have the disadvantage that it is difficult to keep up with diversification in shape, and there is a limit on weight reduction.

Thus, in recent years, a film-shaped laminate including a base material layer, an adhesive layer, a barrier layer and a sealant layer laminated in this order has been proposed as a battery packaging material which is easily processed into diverse shapes and which can be thinned and lightened (see, for example, Patent Document 1). Such a film-shaped battery packaging material is formed in such a manner that a battery element can be sealed by heat-welding the peripheral edge of the sealant layers by heat sealing with the sealant layers facing each other.

In conventional film-shaped battery packaging materials, the barrier layer serves not only to improve the strength of the packaging material but also to prevent ingress of water vapor, oxygen, light and so on into a battery, and metal foils are often used as the barrier layer. These metal foils have low adhesiveness with other layers, so that layer delamination easily occurs. Usually, an electrolytic solution does not contain water, but if water is mixed in the electrolytic solution with some cause, hydrogen fluoride may be generated to corrode or dissolve a metal foil. Thus, conventionally, one or both of the surfaces of a metal foil to be laminated in a film-shaped battery packaging material is subjected to a chromate treatment to impart electrolytic solution resistance to the metal foil, so that bonding of the metal foil to other layers is stabilized, corrosion and dissolution of the metal foil are prevented, and so on. However, performance requirements for film-shaped battery packaging materials are diversified, and it is desired to develop a technique for improving electrolytic solution resistance using a method other than the chromate treatment of a metal foil.

If very small contaminants such as debris of an electrode active material and an electrode tab stick to the surface of the sealant layer in the production process of batteries, the very small contaminants may be brought into contact with the barrier layer by heat and pressure during heat sealing, leading to occurrence of a short-circuit. Accordingly, in the film-shaped battery packaging material, it is required to improve safety by maintaining a high insulation quality even if such very small contaminants enter the battery packaging material. Thus, it is earnestly desired to develop a technique for imparting both excellent electrolytic solution resistance and an excellent insulation quality to the film-shaped battery packaging material.

PRIOR ART DOCUMENT

Patent Document

Patent Document 1: Japanese Patent Laid-open Publication No. 2001-202927

SUMMARY OF THE INVENTION

Problems to be Solved by the Invention

An object of the present invention is to provide a battery packaging material having excellent electrolytic solution resistance. Further, an object of the present invention is to provide a battery packaging material having both excellent electrolytic solution resistance and an excellent insulation quality.

Means for Solving the Problems

The present inventors have extensively conducted studies for achieving the above-mentioned object, and resultantly found that when in a battery packaging material which includes a laminate including at least a base material layer, an adhesive layer, a metal foil layer and a sealant layer in this order, an acid reaction resin layer containing an acid-curable resin is provided between the adhesive layer and the metal foil layer and/or between the metal foil layer and the sealant layer, excellent electrolytic solution resistance can be imparted to the battery packaging material. Further, the present inventors have found that when the acid reaction resin layer is provided with a thickness of 0.01 µm or more between the metal foil layer and the sealant layer, excellent electrolytic solution resistance can be imparted, and also even when very small contaminants stick to the sealant layer, a short-circuit can be prevented to maintain a high insulation quality. A first aspect of the present invention has been completed by further conducting studies based on the above-mentioned findings.

The present inventors have extensively conducted studies for achieving the above-mentioned object, and resultantly found that when in a battery packaging material which includes a laminate including at least a base material layer, an adhesive layer, a metal foil layer and a sealant layer in this order, the sealant layer contains a heat-weldable resin and an acid-curable resin, excellent electrolytic solution resistance and an insulation quality can be imparted to the battery packaging material. A second aspect of the present invention has been completed by further conducting studies based on the above-mentioned findings.

That is, the present invention provides an invention of the aspects described below.

Item 1. A battery packaging material including a laminate including at least a base material layer, an adhesive layer, a metal foil layer and a sealant layer in this order,
  the battery packaging material including an acid reaction resin layer between the adhesive layer and the metal foil layer and/or between the metal foil layer and the sealant layer, the acid reaction resin layer containing an acid-curable resin.

Item 2. The battery packaging material according to item 1, wherein the acid reaction resin layer is provided at least between the metal foil layer and the sealant layer.

Item 3. The battery packaging material according to item 1 or 2, wherein the acid reaction resin layer has a thickness of 0.01 μm or more.

Item 4. A battery packaging material which includes a laminate including at least a base material layer, an adhesive layer, a metal foil layer and a sealant layer in this order, the sealant layer containing a heat-weldable resin and an acid-curable resin.

Item 5. The battery packaging material according to item 3 or 4, wherein the sealant layer contains 0.1 to 35 parts by mass of the acid-curable resin based on 100 parts by mass of the heat-weldable resin.

Item 6. The battery packaging material according to any one of items 1 to 5, wherein the acid-curable resin includes an acid-curable furan resin and/or an acid-curable phenol resin.

Item 7. The battery packaging material according to any one of items 1 to 6, wherein the metal foil layer is an aluminum foil.

Item 8. A method for producing a battery packaging material, the method including:

a first step of forming a laminate in which an acid reaction resin layer containing an acid-curable resin is laminated on at least one of the surfaces of a metal foil layer;

a second step of forming a laminate in which a base material layer is laminated on the laminate obtained in the first step with an adhesive layer interposed therebetween; and a third step of laminating a sealant layer to a surface on a side opposite to the base material layer of the laminate obtained in the second step.

Item 9. A method for producing a battery packaging material, the method including:

a first step of forming a laminate in which a base material layer is laminated on a metal foil layer with an adhesive layer interposed therebetween; and a second step of laminating a sealant layer to a surface on a side opposite to the base material layer of the laminate obtained in the first step, the sealant layer containing a heat-weldable resin and an acid-curable resin.

Item 10. A battery, wherein a battery element including at least a positive electrode, a negative electrode and an electrolyte is stored in the battery packaging material according to any one of items 1 to 7.

Advantages of the Invention

A battery packaging material according to a first aspect of the present invention includes a laminate including at least a base material layer, an adhesive layer, a metal foil layer and a sealant layer in this order, and an acid reaction resin layer is provided between the adhesive layer and the metal foil layer and/or between the metal foil layer and the sealant layer, the acid reaction resin layer containing an acid-curable resin. When the acid reaction resin layer is not in contact with an acid, an uncured acid-curable resin remains, but when water is mixed in an electrolytic solution to generate an acid such as hydrogen fluoride, the acid is captured, and the uncured acid-curable resin contained in the acid reaction resin layer is cured to improve a barrier function against an acid, so that corrosion and dissolution of the metal foil layer can be effectively prevented. Further, when the acid reaction resin layer comes into contact with an acid, the uncured acid-curable resin is cured to improve adhesion, so that reduction of adhesion strength by an electrolytic solution can be suppressed.

In the battery packaging material according to the first aspect of the present invention, at least a part of the acid-curable resin exists in an uncured state, so that the acid reaction resin layer has moderate elasticity, and is therefore hardly cracked even in press-in of very small contaminants, and hardly penetrated with very small contaminants. Accordingly, in the battery packaging material according to the first aspect of the present invention, the acid reaction resin layer having a thickness of 0.01 μm or more is provided between the metal foil layer and the sealant layer, so that even when the battery packaging material is heat-sealed with very small contaminants sticking to the sealant layer, penetration of the very small contaminants to the metal foil layer can be suppressed to maintain a high insulation quality.

Further, in the first aspect of the present invention, excellent electrolytic solution resistance can be imparted owing to the acid reaction resin layer, and therefore there can be provided a battery packaging material including a metal foil layer which is not subjected to a chromate treatment, so that use of chromium which causes environmental pollution can be avoided to contribute to reduction of environmental loading.

A battery packaging material according to a second aspect of the present invention includes a laminate including at least a base material layer, an adhesive layer, a metal foil layer and a sealant layer in this order, the sealant layer containing a heat-weldable resin and an acid-curable resin. When the acid-curable resin is not in contact with an acid, an uncured acid-curable resin remains even after heat sealing, but when water is mixed in an electrolytic solution to generate an acid such as hydrogen fluoride, the acid is captured, and the uncured acid-curable resin is cured to improve a barrier function against an acid, so that the acid can be prevented from penetrating to the metal foil layer to corrode and dissolve the metal foil layer. Further, when the sealant layer comes into contact with an acid, the uncured acid-curable resin is cured to improve adhesion, so that reduction of adhesion strength by an electrolytic solution can be suppressed.

In the battery packaging material according to the second aspect of the present invention, at least a part of the acid-curable resin exists in an uncured state even after heat sealing, so that the sealant layer has moderate elasticity, and is therefore hardly cracked even in press-in of very small contaminants, and hardly penetrated with very small contaminants. Accordingly, even when the battery packaging material according to the second aspect of the present invention is heat-sealed with very small contaminants sticking to the sealant layer, penetration of the very small contaminants to the metal foil layer can be suppressed to maintain a high insulation quality.

Further, in the second aspect of the present invention, excellent electrolytic solution resistance can be imparted by including an acid-curable resin in the sealant layer, and therefore there can be provided a battery packaging material including a metal foil layer which is not subjected to a chromate treatment, so that use of chromium which causes environmental pollution can be avoided to contribute to reduction of environmental loading.

EMBODIMENTS OF THE INVENTION

Figure 1:
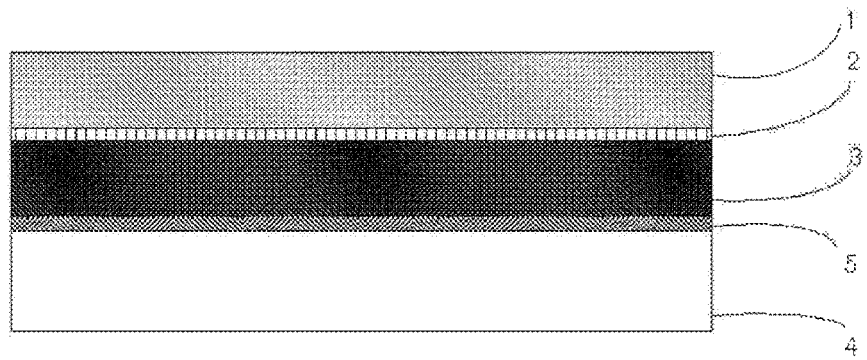
FIG. 1 is a drawing showing one example of a cross-sectional structure of a battery packaging material according to a first aspect of the present invention.

A battery packaging material according to a first aspect of the present invention includes a laminate including at least a base material layer, an adhesive layer, a metal foil layer and a sealant layer in this order, and an acid reaction resin layer is provided between the adhesive layer and the metal foil layer and/or between the adhesive layer and the sealant layer, the acid reaction resin layer containing an acid-curable resin. A battery packaging material according to a second aspect of the present invention includes a laminate including at least a base material layer, an adhesive layer, a metal foil layer and a sealant layer in this order, the sealant layer containing a heat-weldable resin and an acid-curable resin. Hereinafter, the battery packaging materials according to the first aspect and the second aspect of the present invention will be described in detail.

1. Laminated Structure of Battery Packaging Material (1-1) Battery Packaging Material of First Aspect of Invention The battery packaging material according to the first aspect of the present invention has a laminated structure which includes a laminate including at least a base material layer 1, an adhesive layer 2, a metal foil layer 3 and a sealant layer 4 in this order, and an acid reaction resin layer 5 is provided between the adhesive layer 2 and the metal foil layer 3 and/or between the metal foil layer 3 and the sealant layer 4.

Figure 2:
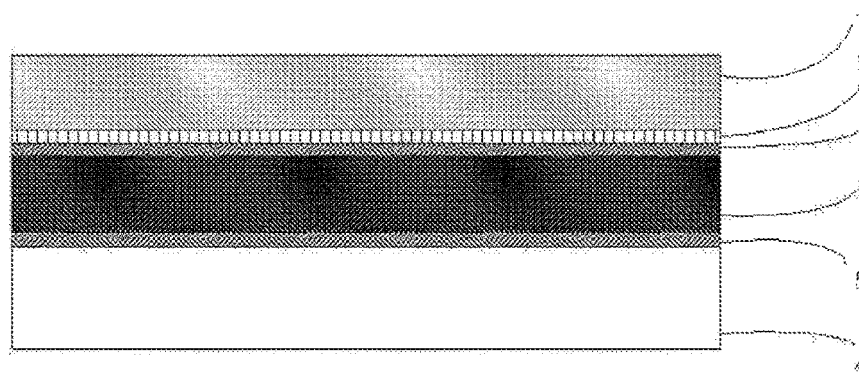
FIG. 2 is a drawing showing one example of a cross-sectional structure of the battery packaging material according to the first aspect of the present invention.

In the battery packaging material according to the first aspect of the present invention, the acid reaction resin layer 5 may be provided either between the adhesive layer 2 and the metal foil layer 3 or between the metal foil layer 3 and the sealant layer 4, but for imparting further excellent electrolytic solution resistance, the acid reaction resin layer 5 is provided preferably at least between the metal foil layer 3 and the sealant layer 4, further preferably both between the adhesive layer 2 and the metal foil layer 3 and between the metal foil layer 3 and the sealant layer 4. For imparting an excellent insulation quality to the battery packaging material according to the first aspect of the present invention, it is necessary that the acid reaction resin layer 5 be provided at least between the metal foil layer 3 and the sealant layer 4. FIG. 1 shows an aspect in which the acid reaction resin layer 5 is provided between the metal foil layer 3 and the sealant layer 4 as one example of a cross-sectional structure of the battery packaging material according to the first aspect of the present invention. FIG. 2 shows an aspect in which the acid reaction resin layer 5 is provided both between the adhesive layer 2 and the metal foil layer 3 and between the metal foil layer 3 and the sealant layer 4 as one example of a cross-sectional structure of the battery packaging material according to the first aspect of the present invention.

In the battery packaging material according to the first aspect of the present invention, an adhesive layer 6 may be provided on the sealant layer 4 on the base material layer 1 side as necessary in order to improve the adhesiveness of the sealant layer 4.

(1-2) Battery Packaging Material of Second Aspect of Invention

Figure 3:
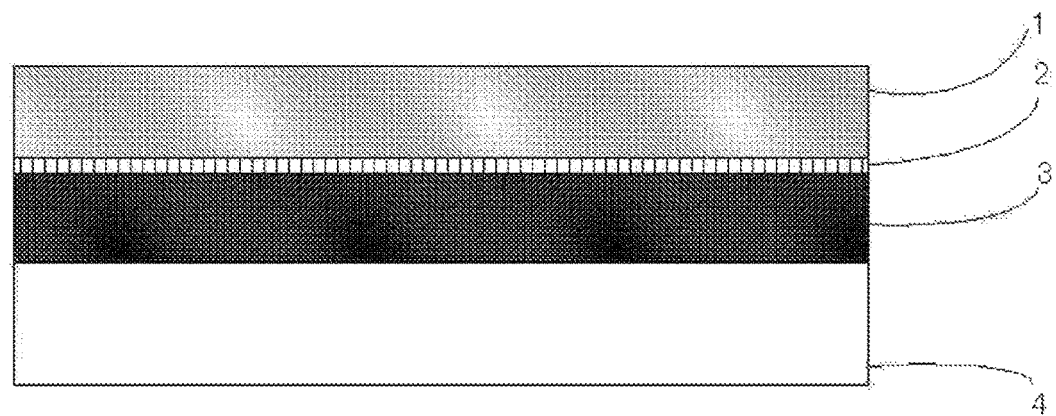
FIG. 3 is a drawing showing one example of a cross-sectional structure of a battery packaging material according to a second aspect of the present invention.

The battery packaging material according to the second aspect of the present invention has a laminated structure which includes a laminate including at least a base material layer 1, an adhesive layer 2, a metal foil layer 3 and a sealant layer 4 in this order. FIG. 3 shows an aspect in which the base material layer 1, the adhesive layer 2, the metal foil layer 3 and the sealant layer 4 are laminated in this order as one example of a cross-sectional structure of the battery packaging material according to the second aspect of the present invention.

In the battery packaging material according to the second aspect of the present invention, an adhesive layer 6 may be provided on the sealant layer 4 on the base material layer 1 side as necessary in order to improve the adhesiveness of the sealant layer 4.

The battery packaging materials according to the first aspect and the second aspect of the present invention have the base material layer 1 as the outermost layer and the sealant layer 4 as the innermost layer. During assembly of a battery, the sealant layers 4 situated on the peripheral edge of a battery element are brought into contact with each other, and heat-welded to hermetically seal the battery element, so that the battery element is encapsulated.

2. Composition of Each Layer Forming Battery Packaging Material (2-1) Battery Packaging Material of First Aspect of Invention

[Acid Reaction Resin Layer 5]

In the battery packaging material according to the first aspect of the present invention, the acid reaction resin layer 5 is a layer provided between the adhesive layer 2 and the metal foil layer 3 and/or between the metal foil layer 3 and the sealant layer 4. The acid reaction resin layer 5 is formed of an acid-curable resin. By providing the acid reaction resin layer 5 between the adhesive layer 2 and the metal foil layer 3 and/or between the metal foil layer 3 and the sealant layer 4 using an acid-curable resin as described above, excellent electrolytic solution resistance can be imparted. Further, when the acid reaction resin layer 5 is provided between the metal foil layer 3 and the sealant layer 4, not only excellent electrolytic solution resistance can be imparted, but also an insulation quality can be improved.

The acid-curable resin is a resin which is cured when subjected to polycondensation by an acid. The type of the acid-curable resin to be used in the first aspect of the present invention is not particularly limited, and examples thereof include acid-curable furan resins and acid-curable phenol resins.

Specific examples of the acid-curable furan resin include furfuryl alcohol, condensates of furfuryl alcohol, condensates of furfuryl alcohol and an aldehyde, condensates of furfuryl alcohol and urea, condensates of furfuryl alcohol, a phenol and an aldehyde, condensates of furfuryl alcohol, melamine and an aldehyde, and condensates of furfuryl alcohol, urea and an aldehyde. These acid-curable furan resins may be used alone, or may be used in combination of two or more thereof.

Examples of the aldehyde to be condensed with furfuryl alcohol include formaldehyde, acetaldehyde, glyoxal, furfural and terephthalaldehyde. These aldehydes may be used alone, or may be used in combination of two or more thereof.

Examples of the phenol to be condensed with furfuryl alcohol include phenol, cresol, resorcin, bisphenol A, bisphenol C, bisphenol E and bisphenol F. These phenols may be used alone, or may be used in combination of two or more thereof.

The acid-curable phenol resin may be of novolac type or of resol type. The acid-curable phenol resins may be used alone, or may be used in combination of two or more thereof.

These acid-curable resins may be used alone, or may be used in combination of two or more thereof. Among these acid-curable resins, thermosetting furan resins are preferred, and urea-modified furan resins such as condensates of furfuryl alcohol and urea, and condensates of furfuryl alcohol, urea and an aldehyde are further preferred for imparting further excellent electrolytic solution resistance and an insulation quality.

In the acid reaction resin layer 5, a part of the acid-curable resin may be cured as long as at least a part thereof exists in an uncured state. When at least a part of the acid-curable resin exists in an uncured state as described above, it can be cured to impart excellent electrolytic solution resistance when coming into contact with an acid generated in an electrolytic solution. When at least a part of the acid-curable resin exists in an uncured state, the acid reaction resin layer 5 has moderate elasticity, and is thus hardly cracked even in press-in of very small contaminants, and hardly penetrated with very small contaminants. Therefore, by providing the acid reaction resin layer 5 between the metal foil layer 3 and the sealant layer 4, penetration of very small contaminants to the metal foil layer 3 can be suppressed to maintain a high insulation quality even when the battery packaging material is heat-sealed with the very small contaminants sticking to the sealant layer 4.

For ensuring that a part of the acid-curable resin exists in a cured state in the acid reaction resin layer 5, a heating treatment may be performed after the acid-curable resin is applied to a predetermined portion. Conditions for the heating treatment may be appropriately set according to the type of an acid-curable resin to be used, the degree of curing the acid-curable resin, and so on, and for example, the temperature is 120 to 250° C., preferably 150 to 200° C., and the time is 0.1 to 60 seconds, preferably 1 to 30 seconds.

The thickness of the acid reaction resin layer 5 is, for example, 0.005 μm or more, preferably 0.01 μm or more, more preferably 1 μm or more, further preferably 3 μm or more. The upper limit value of the thickness of the acid reaction resin layer 5 is not particularly limited, and it is, for example, 7 μm, preferably 5 μm. When the acid reaction resin layer 5 is provided between the metal foil layer 3 and the sealant layer 4 to impart excellent electrolytic solution resistance, and also an excellent insulation quality, the thickness of the acid reaction resin layer 5 is 0.01 μm or more, preferably 0.9 μm or more, more preferably 1 to 7 μm, further preferably 3 to 7 μm, especially preferably 3 to 5 μm.

[Base material layer 1]

In the battery packaging material according to the first aspect of the present invention, the base material layer 1 is a layer that forms the outermost layer. The material that forms the base material layer 1 is not particularly limited as long as it has an insulation quality. Examples of the material that forms the base material layer 1 include polyesters, polyamides, epoxies, acrylics, fluororesins, polyurethanes, silicon resins, phenols, polyetherimides, polyimides, and mixtures and copolymers thereof.

Specific examples of the polyester include polyethylene terephthalate, polybutylene terephthalate, polyethylene naphthalate, polybutylene naphthalate, polyethylene isophthalate, polycarbonate, copolymerized polyesters including ethylene terephthalate as a main repeating unit, and copolymerized polyesters including butylene terephthalate as a main repeating unit. Specific examples of the copolymerized polyester including ethylene terephthalate as a main repeating unit include copolymer polyesters that are obtained by polymerizing ethylene isophthalate with ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene(terephthalate/decane dicarboxylate). Specific examples of the copolymerized polyester including butylene terephthalate as a main repeating unit include copolymer polyesters that are obtained by polymerizing butylene isophthalate with butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 1.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerized polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymetaxylylene adipamide (MXD6); cycloaliphatic polyamides such as polyaminomethyl cyclohexyl adipamide (PACM 6); polyamides obtained by copolymerizing lactam components or isocyanate components such as 4,4'-diphenylmethane-diisocyanate, and polyester amide copolymers and polyether ester amide copolymers as copolymers of a copolymerized polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1.

Among them, nylons and polyesters are preferred, and biaxially stretched nylons and biaxially stretched polyesters are further preferred, with biaxially stretched polyesters being especially preferred, as resin films for formation of the base material layer 1.

The base material layer 1 can also be a laminate with a resin film which is made of a different material for improving pinhole resistance, and an insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with an adhesive agent interposed therebetween, or may be directly laminated without an adhesive agent interposed therebetween. Examples of the method for bonding the resin films without an adhesive agent interposed therebetween include methods in which the resin films are bonded in a heat-melted state, such as a co-extrusion method, a sand lamination method and a thermal lamination method.

The friction of the base material layer 1 may be reduced for improving moldability. When the friction of the base material layer 1 is reduced, the friction coefficient of the surface thereof is not particularly limited, and it is, for example, 1.0 or less. Examples of the method for reducing the friction of the base material layer 1 include a matting treatment, formation of a thin film layer of a slipping agent, and a combination thereof.

Examples of the method for performing the matting treatment include a method in which a matting agent is added to the base material layer 1 beforehand to form irregularities on the surface, a transfer method by heating or pressurization with an embossing roll, and a method in which the surface is mechanically roughened using dry or wet blasting, or a file. Examples of the matting agent include fine particles having a particle size of about 0.5 nm to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acryl, crosslinked styrene, crosslinked polyethylene, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and a dispersibility enhancing treatment.

The thin film layer of a slipping agent can be formed by precipitating a slipping agent on the surface of the base material layer 1 by bleeding-out to form a thin layer, or laminating a slipping agent on the base material layer 1. The slipping agent is not particularly limited, and examples thereof include fatty acid amides, metal soaps, hydrophilic silicones, acrylics grafted with silicone, epoxies grafted with silicone, polyethers grafted with silicone, polyesters grafted with silicone, block silicone acrylic copolymers, polyglycerol-modified silicones and paraffins. These slipping agents may be used alone, or may be used in combination of two or more thereof.

The thickness of the base material layer 1 is, for example, 10 to 50 μm, preferably 15 to 30 μm.

[Adhesive Layer 2]

In the battery packaging material according to the first aspect of the present invention, the adhesive layer 2 is a layer disposed on the base material layer 1 for imparting adhesion to the base material layer 1. Specifically, when the acid reaction resin layer 5 is provided on the metal foil layer 3 on the base material layer 1 side, the adhesive layer 2 is provided between the base material layer 1 and the acid reaction resin layer 5. When the acid reaction resin layer 5 is not provided on the metal foil layer 3 on the base material layer 1 side, the adhesive layer 2 is provided between the base material layer 1 and the metal foil layer 3.

The adhesive layer 2 is formed from an adhesive agent capable of bonding the base material layer 1 and the acid reaction resin layer 5 or the metal foil layer 3. The adhesive agent used for forming the adhesive layer 2 may be a two-liquid curable adhesive agent, or may be a one-liquid curable adhesive agent. Further, the bonding mechanism of the adhesive agent used for forming the adhesive layer 2 is not particularly limited, and may be any one of a chemical reaction type, a solvent volatilization type, a heat melting type, a heat pressing type and so on.

Specific examples of the resin component of the adhesive agent that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyesters; polyether-based adhesive agents; polyurethane-based adhesive agents; epoxy-based resins; phenol resin-based resins; polyamide-based resins such as nylon 6, nylon 66, nylon 12 and copolymerized polyamides; polyolefin-based resins such as polyolefins, acid-modified polyolefins and metal-modified polyolefins; polyvinyl acetate-based resins; cellulose-based adhesive agents; (meth)acryl-based resins; polyimide-based resins; amino resins such as urea resins and melamine resins; rubbers such as chloroprene rubber, nitrile rubber and styrene-butadiene rubber; silicone-based resins; and ethylene fluoride-propylene copolymers. These adhesive agent components may be used alone, or may be used in combination of two or more thereof. The combination form of two or more adhesive agent components is not particularly limited, and examples of the adhesive agent components include mixed resins of polyamides and acid-modified polyolefins, mixed resins of polyamides and metal-modified polyolefins, mixed resins of polyamides and polyesters, mixed resins of polyesters and acid-modified polyolefins, and mixed resins of polyesters and metal-modified polyolefins. Among them, polyurethane-based two-liquid curable adhesive agents; and polyamides, polyesters or blend resins of these resins and modified polyolefins are preferred because they are excellent in spreadability, durability and a transformation inhibition action under high-humidity conditions, a thermal degradation inhibition action during heat-sealing, and so on, and effectively suppress occurrence of delamination by inhibiting a reduction in lamination strength between the base material layer 1 and the metal layer 2.

The adhesive layer 2 may be made multilayered with different adhesive agent components. When the adhesive layer 2 is made multilayered with different adhesive agent components, it is preferred that a resin excellent in adhesiveness with the base material layer 1 is selected as an adhesive agent component to be disposed on the base material layer 1 side, and an adhesive agent component excellent in adhesiveness with the metal foil layer 3 is selected as an adhesive agent component to be disposed on the metal foil layer 3 side for improving the lamination strength between the base material layer 1 and the metal foil layer 3. When the adhesive layer 2 is made multilayered with different adhesive agent components, specific examples of the preferred adhesive agent component to be disposed on the metal foil layer 3 side include acid-modified polyolefins, metal-modified polyolefins, mixed resins of polyesters and acid-modified polyolefins, and resins containing a copolymerized polyester.

The thickness of the adhesive layer 2 is, for example, 2 to 50 μm, preferably 3 to 25 μm.

[Metal Foil Layer 3]

In the battery packaging material according to the first aspect of the present invention, the metal foil layer 3 is a layer which is intended to improve the strength of the packaging material, and also functions as a barrier layer for preventing ingress of water vapor, oxygen, light and the like into the battery. Specific examples of the metal that forms the metal foil layer 3 include metal foils such as those of aluminum, stainless steel and titanium. Among them, aluminum is suitably used. For preventing occurrence of creases and pinholes during production of the packaging material, it is preferred to use soft aluminum, for example annealed aluminum (JIS A8021P-O) or (JIS A8079P-O), for the metal foil layer 3 in the first aspect of the present invention.

The thickness of the metal foil layer 3 is, for example, 10 to 200 μm, preferably 20 to 100 μm.

In the battery packaging material according to the first aspect of the present invention, the acid reaction resin layer 5 is provided to impart excellent electrolytic solution resistance, and therefore it is not necessary to subject the metal foil layer 3 to a chromate treatment. For making much of reduction of environmental loading by avoiding use of chromium which causes environmental pollution, the metal foil layer 3 that has not been subjected to a chromate treatment may be used, and for further improving electrolytic solution resistance, the metal foil layer 3 subjected to a chromate treatment may be used.

Examples of the chromate treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, the repeating units represented by the following general formulae (1) to (4) may be contained alone, or may be contained in any combination of two or more thereof.

[Chemical Formula 1]

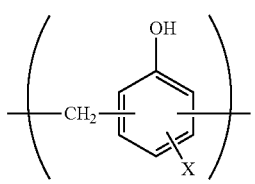

(1)

[Chemical Formula 2]

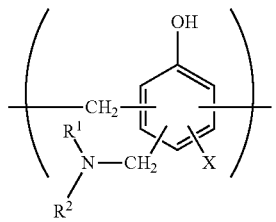

(2)

[Chemical Formula 3]

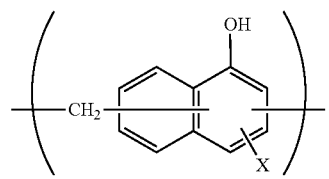

(3)

[Chemical Formula 4]

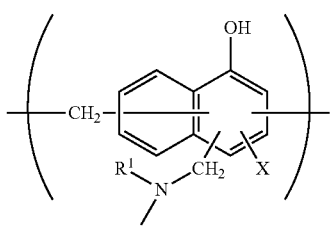

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxyl group, or a hydroxyalkyl group. A number average molecular weight of the aminated phenol polymer having repeating units represented by the general formulae (1) to (4) is preferably 500 to 1000000, and more preferably about 1000 to 20000, for example.

The amount of the acid resistance film to be formed on the surface of the metal foil layer 3 in the chromate treatment is not particularly limited, but for example, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to about 200 mg, preferably about 5.0 mg to 150 mg, per 1 m$^2$ of the surface of the metal foil layer 3.

The chromate treatment is performed in the following manner: a solution containing a compound to be used for formation of an acid resistance film is applied to the surface of the metal foil layer 3 by a bar coating method, a roll coating method, a gravure coating method, an immersion method or the like, and heating is then performed so that the temperature of the metal foil layer 3 is about 70° C. to 200° C. The metal foil layer 3 may be subjected to a degreasing treatment by an alkali immersion method, an electrolytic cleaning method, an acid cleaning method, an electrolytic acid cleaning method or the like before the metal foil layer 3 is subjected to the chromate treatment. When a degreasing treatment is performed as described above, the chromate treatment of the surface of the metal foil layer 3 can be further efficiently performed.

Further, the metal foil layer 3 may be subjected to a chemical conversion treatment for imparting corrosion resistance as necessary. Specific examples of the chemical conversion treatment method for imparting corrosion resistance to the metal foil layer 3 include a method in which the metal foil layer 3 is coated with a dispersion of fine particles of a metal oxide such as aluminum oxide, titanium oxide, cerium oxide or tin oxide or barium sulfate in phosphoric acid, and baked at 150° C. or higher to form a corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

[Adhesive Layer 6]

In the battery packaging material according to the first aspect of the present invention, the adhesive layer 6 is a layer that is provided on the sealant layer 4 on the base material layer 1 side as necessary for strongly bonding the sealant layer 4. Specifically, when the acid reaction resin layer 5 is provided on the metal foil layer 3 on the sealant layer 4 side, the adhesive layer 6 is provided between the acid reaction resin layer 5 and the sealant layer 4. When the acid reaction resin layer 5 is not provided on the metal foil layer 3 on the sealant layer 4 side, the adhesive layer 6 is provided between the metal foil layer 3 and the sealant layer 4.

The adhesive layer 6 is formed from an adhesive agent capable of bonding the acid reaction resin layer 5 or the metal foil layer 3 and the sealant layer 4. The composition of the adhesive agent to be used for formation of the adhesive layer 6 is not particularly limited, and examples thereof include resin compositions containing a thermosetting resin. Specific examples of the thermosetting resin to be used in the adhesive layer 6 are the same as those shown above in the adhesive layer 2.

The thickness of the adhesive layer 6 is, for example, 1 to 40 μm, preferably 2 to 30 μm.

[Sealant Layer 4]

In the battery packaging material according to the first aspect of the present invention, the sealant layer 4 corresponds to the innermost layer, and during assembly of a battery, the sealant layers are heat-welded to each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); and terpolymers of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer obtained by modifying the polyolefin with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as those used for modification of the acid-modified cycloolefin copolymer.

Among these resin components, crystalline or noncrystalline polyolefins, cyclic polyolefins, and blend polymers thereof are preferred, and polyethylene, polypropylene, copolymers of ethylene and norbornene, and blend polymers of two or more thereof are further preferred.

The sealant layer 4 may be formed from one resin component alone, or may be formed from a blend polymer obtained by combining two or more resin components. Further, the sealant layer may be formed of only one layer, or may be formed of two or more layers with the same resin component or different resin components.

The thickness of the sealant layer 4 is not particularly limited, but it is 2 to 2000 μm, preferably 5 to 1000 μm, further preferably 10 to 500 μm.

(2-2) Battery Packaging Material of Second Aspect of Invention

[Base material layer 1]

In the battery packaging material according to the second aspect of the present invention, the base material layer 1 is a layer that forms the outermost layer, and the base material layer 1 is the same as that in the first aspect of the present invention.

[Adhesive Layer 2]

In the battery packaging material according to the second aspect of the present invention, the adhesive layer 2 is a layer disposed on the base material layer 1 for imparting adhesion to the base material layer 1. In other words, the adhesive layer 2 is provided between the base material layer 1 and the metal foil layer 3.

The adhesive layer 2 is formed from an adhesive agent capable of bonding the base material layer 1 and the metal foil layer 3. The adhesive agent used for forming the adhesive layer 2 may be a two-liquid curable adhesive agent, or may be a one-liquid curable adhesive agent. Further, the bonding mechanism of the adhesive agent used for forming the adhesive layer 2 is not particularly limited, and may be any one of a chemical reaction type, a solvent volatilization type, a heat melting type, a heat pressing type and so on.

Examples of the resin component of an adhesive agent that can be used for formation of the adhesive layer 2 include those that are the same as shown above in the first aspect of the present invention.

The adhesive layer 2 may be made multilayered with different adhesive agent components as in the case of the first aspect of the present invention.

The thickness of the adhesive layer 2 is, for example, 2 to 50 µm, preferably 3 to 25 µm.

[Metal Foil Layer 3]

In the battery packaging material according to the second aspect of the present invention, the metal foil layer 3 is a layer which is intended to improve the strength of the packaging material, and also functions as a barrier layer for preventing ingress of water vapor, oxygen, light and the like into the battery. Thus, the metal foil layer 3 in the second aspect of the present invention is the same as the metal foil layer 3 in the first aspect of the present invention. In the second aspect of the present invention, excellent electrolytic solution resistance can be imparted by including an acid-curable resin in the sealant layer, and therefore there can be provided a battery packaging material including a metal foil layer which is not subjected to a chromate treatment, so that use of chromium which causes environmental pollution can be avoided to contribute to reduction of environmental loading.

[Adhesive Layer 6]

In the battery packaging material according to the second aspect of the present invention, the adhesive layer 6 is a layer that is provided between the metal foil layer 3 and the sealant layer 4 as necessary for strongly bonding the sealant layer 4.

The adhesive layer 6 is formed from an adhesive agent capable of bonding the metal foil layer 3 and the sealant layer 4 to each other. The composition of the adhesive agent to be used for formation of the adhesive layer 6 is not particularly limited, and examples thereof include resin compositions containing a thermosetting resin. Specific examples of the thermosetting resin to be used in the adhesive layer 6 are the same as shown above in the adhesive layer 2.

The thickness of the adhesive layer 6 is, for example, 1 to 40 µm, preferably 2 to 30 µm.

[Sealant Layer 4]

In the battery packaging material according to the second aspect of the present invention, the sealant layer 4 corresponds to the innermost layer, and during assembly of a battery, the sealant layers are heat-welded to each other to hermetically seal the battery element.

In the battery packaging material according to the second aspect of the present invention, the sealant layer 4 contains a heat-weldable resin and an acid-curable resin. When the sealant layer 4 contains an acid-curable resin together with a heat-weldable resin, excellent electrolytic solution resistance and an insulation quality can be imparted together with heat-sealing properties.

The heat-weldable resin is not particularly limited as long as it can be hermetically sealed by heat sealing to store a battery element, and examples thereof include polyolefins, cyclic polyolefins, carboxylic acid-modified polyolefins and carboxylic acid-modified cyclic polyolefins. Specific examples of the heat-weldable resin include those that are the same as shown above in the sealant layer 4 in the first aspect of the present invention.

The acid-curable resin is a resin which is cured when subjected to polycondensation by an acid, and examples thereof include those that are the same as shown above in the acid reaction resin layer 5 in the first aspect of the present invention.

In the sealant layer 4, a part of the acid-curable resin may be cured as long as at least a part thereof is contained in an uncured state. When at least a part of the acid-curable resin exists in an uncured state as described above, it can be cured to impart excellent electrolytic solution resistance when coming into contact with an acid generated in an electrolytic solution. When at least a part of the acid-curable resin exists in an uncured state, the sealant layer 4 has moderate elasticity, and is thus hardly cracked even in press-in of very small contaminants, and hardly penetrated with very small contaminants. Therefore, penetration of very small contaminants to the metal foil layer 3 can be suppressed to maintain a high insulation quality even when the battery packaging material is heat-sealed with the very small contaminants sticking to the sealant layer 4.

For ensuring that a part of the acid-curable resin exists in a cured state in the sealant layer 4, a heating treatment may be performed after a resin composition for forming the sealant layer is applied. Conditions for the heating treatment may be appropriately set according to the type of an acid-curable resin to be used, the degree of curing the acid-curable resin, and so on, and for example, the temperature is 120 to 250° C., preferably 150 to 200° C., and the time is 0.1 to 60 seconds, preferably 1 to 30 seconds.

In the sealant layer 4, the ratio between the heat-weldable resin and the acid-curable resin is not particularly limited, and for example, the amount of the acid-curable resin based on 100 parts by mass of the heat-weldable resin is 0.1 to 35 parts by mass, preferably 0.1 to 30 parts by mass, more preferably 1 to 20 parts by mass, further preferably 3 to 15 parts by mass. By satisfying a ratio as described above, further excellent heat-sealing properties, electrolytic solution resistance and an insulation quality can be imparted.

Further, the sealant layer may be formed of only one layer, or may be formed of two or more layers having the same composition or different compositions. When two or more sealant layers are provided, the acid-curable resin may be contained in at least one of the two or more layers that form the sealant layer 4.

The thickness of the sealant layer 4 is not particularly limited, and for example, it is 2 to 2000 μm, preferably 5 to 1000 μm, further preferably 10 to 500 μm.

3. Method for Producing Battery Packaging Material (3-1) Battery Packaging Material of First Aspect of Invention While the method for producing a battery packaging material according to the first aspect of the present invention is not particularly limited as long as a laminate including layers each having predetermined composition is obtained, and examples thereof include a method including the following first to third steps:

a first step of forming a laminate in which the acid reaction resin layer 5 is laminated on at least one of the surfaces of the metal foil layer 3 (hereinafter, sometimes referred to as a "laminate A");

a second step of forming a laminate in which the base material layer 1 and the laminate A are laminated to each other with the adhesive layer 2 interposed therebetween (hereinafter, sometimes referred to as a "laminate B"); and a third step of laminating the sealant layer 5 to a surface of the laminate B on a side opposite to the base material layer 1.

The formation of the laminate A in the first step is performed specifically by applying a resin component, which forms the acid reaction resin layer 5, to one or both of the surfaces of the metal foil layer by a gravure coating method, a roll coating method or the like. When a part of the acid-curable resin in the acid reaction resin layer 5 is cured, a heating treatment may be performed under the above-mentioned conditions after application. When a dry lamination method is employed in the later-described second step, a part of the acid-curable resin in the acid reaction resin layer 5 can be cured by the heating treatment performed in the second step without performing a heating treatment in the first step.

The formation of the laminate B in the second step is performed specifically by curing an adhesive agent with the base material layer 1 and the laminate B bonded to each other with the adhesive agent interposed therebetween, the adhesive agent being used for formation of the adhesive layer 2. For example, when the laminate B is formed by a dry lamination method, an adhesive agent to be used for formation of the adhesive layer 2 may be applied onto the base material layer 1 or the laminate B by a gravure coating method, a roll coating method or the like, and dried, followed by laminating the laminate B or the base material layer 1, and performing a heating treatment. Conditions for the heating treatment may be appropriately set according to the type of a resin component in the adhesive agent, and so on, and for example, the temperature is 25 to 100° C., preferably 30 to 80° C., and the time is 1 to 10 days, preferably 2 to 7 days.

When the adhesive layer 6 is not provided, the third step may be carried out by applying a resin component, which forms the sealant layer 5, to a surface of the laminate B on a side opposite to the base material layer 1 using a method such as a gravure coating method or a roll coating method. When the adhesive layer 6 is provided, the third step is carried out by, for example, (1) a method in which the adhesive layer 6 and the sealant layer 5 are co-extruded to be laminated on a surface of the laminate B on a side opposite to the base material layer 1 (co-extrusion lamination method); (2) a method in which the adhesive layer 6 and the sealant layer 5 are laminated to form a laminate separately, and this laminate is laminated on a surface of the laminate B on a side opposite to the base material layer 1 by a thermal lamination method; (3) a method in which an adhesive agent for formation of the adhesive layer 6 is laminated on a surface of the laminate B on a side opposite to the base material layer 1, for example, by an extrusion method or a method in which the adhesive agent is applied by solution coating, dried at a high temperature and baked, and the sealant layer 5 formed in a sheet shape beforehand is laminated on the adhesive layer 6 by a thermal lamination method; and (4) a method in which an adhesive agent for formation of the adhesive layer 6 is kept in a molten state, and poured between a surface of the laminate B on a side opposite to the base material layer 1 and the sealant layer 5 formed in a sheet shape beforehand, and simultaneously the surface of the laminate B on a side opposite to the base material layer 1 and the sealant layer 5 are bonded to each other with the adhesive layer 6 interposed therebetween (sandwich lamination method).

In the manner described above, a laminate including the base material layer 1, the adhesive layer 2, the metal foil layer 3 and the sealant layer 4 in this order, and including an acid reaction resin layer between the adhesive layer 2 and the metal foil layer 3 and/or between the metal foil layer 3 and the sealant layer 4 is formed.

(3-2) Battery Packaging Material of Second Aspect of Invention

While the method for producing a battery packaging material according to the second aspect of the present invention is not particularly limited as long as a laminate including layers each having predetermined composition is obtained, and examples thereof include a method including the following first to third steps:

a first step of forming a laminate in which the base material layer 1 is laminated on the metal foil layer 3 with the adhesive layer 2 interposed therebetween (hereinafter, sometimes referred to as a "laminate A"); and a second step of laminating a sealant layer to a surface on a side opposite to the base material layer of the laminate A obtained in the first step, the sealant layer containing a heat-weldable resin and an acid-curable resin.

The formation of the laminate A in the first step is performed specifically by curing an adhesive agent with the base material layer 1 and the metal foil layer 3 bonded to each other with the adhesive agent interposed therebetween, the adhesive agent being used for formation of the adhesive layer 2. For example, when the laminate A is formed by a dry lamination method, an adhesive agent to be used for formation of the adhesive layer 2 may be applied onto the base material layer 1 or the metal foil layer 3 by a gravure coating method, a roll coating method or the like, and dried, followed by laminating the metal foil layer 3 or the base material layer 1, and performing a heating treatment. Conditions for the heating treatment may be appropriately set according to the type of a resin component in the adhesive agent, and so on, and for example, the temperature is 25 to 100° C., preferably 30 to 80° C., and the time is 1 to 10 days, preferably 2 to 7 days.

When the adhesive layer 6 is not provided, the second step may be carried out by applying a resin component, which contains a heat-weldable resin and an acid-curable resin, to a surface of the laminate A on a side opposite to the base material layer 1 using a method such as a gravure coating method or a roll coating method. When the adhesive layer 6 is provided, the second step is carried out by, for example, (1) a method in which the adhesive layer 6 and the sealant layer 4 are co-extruded to be laminated on a surface of the laminate A on a side opposite to the base material layer 1 (co-extrusion lamination method); (2) a method in which the adhesive layer 6 and the sealant layer 4 are laminated to form a laminate separately, and this laminate is laminated on a surface of the laminate A on a side opposite to the base material layer 1 by a thermal lamination method; (3) a method in which an adhesive agent for formation of the adhesive layer 6 is laminated on a surface of the laminate A on a side opposite to the base material layer 1, for example, by an extrusion method or a method in which the adhesive agent is applied by solution coating, dried at a high temperature and baked, and the sealant layer 4 formed in a sheet shape beforehand is laminated on the adhesive layer 6 by a thermal lamination method; and (4) a method in which an adhesive agent for formation of the adhesive layer 6 is kept in a molten state, and poured between a surface of the laminate A on a side opposite to the base material layer 1 and the sealant layer 5 formed in a sheet shape beforehand, and simultaneously the surface of the laminate A on a side opposite to the base material layer 1 and the sealant layer 5 are bonded to each other with the adhesive layer 6 interposed therebetween (sandwich lamination method). For curing a part of the acid-curable resin contained in the sealant layer 5, for example, a heating treatment may be performed after a resin composition containing a heat-weldable resin and an acid-curable resin is applied to a predetermined portion. Conditions for the heating treatment are as described in the section [Sealant layer 4] in the second aspect of the present invention.

In the manner described above, a laminate including the base material layer 1, the adhesive layer 2, the metal foil layer 3 and the sealant layer 4 in this order is formed.

In the battery packaging materials according to the first aspect and the second aspect of the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging materials according to the first aspect and the second aspect of the present invention are each used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the first aspect or the second aspect of the present invention such that a flange portion (region where sealant layers are in contact with each other) can be formed on the periphery of the battery element while a metal terminal connected to each of the positive electrode and the negative electrode protrudes to the outside, and the sealant layers at the flange portion are heat-sealed with each other for hermetical sealing, thereby providing a battery using a battery packaging material. When the battery element is stored using the battery packaging material according to the first aspect or the second aspect of the present invention, the battery packaging material according to the first aspect of the present invention is used such that the sealant portion is on the inner side (surface in contact with the battery element).

The battery packaging material according to the first aspect or the second aspect of the present invention may be used for either a primary battery or a secondary battery, but is preferably used for a secondary battery. The type of the secondary battery to which the battery packaging material according to the first aspect or the second aspect of the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the first aspect or the second aspect of the present invention is applied include lithium ion batteries and lithium ion polymer batteries.

EXAMPLES

The first aspect and the second aspect of the present invention will be described in detail below by way of examples and comparative examples. It is to be noted that the first aspect and the second aspect of the present invention are not limited to the examples.

1-1. Production of Battery Packaging Material of First Aspect of Invention

Examples 1A to 7A

To one of the surfaces of a metal foil layer composed of an aluminum foil (thickness: 40 μm) which had not been subjected to a chromate treatment, a urea-modified furan resin (HP 6200N, manufactured by ASAHI YUKIZAI CORPORATION) was applied by a roll coating method so as to have an ultimate film thickness as shown in Table 1, and heated at 190° C. for 3 seconds to form an acid reaction resin layer on the metal foil layer. An adhesive layer composed of a two-liquid urethane adhesive agent including a polyester-based main agent and an isocyanate-based curing agent was then applied to a surface of the metal foil layer on a side opposite to the acid reaction resin layer in such a manner that the adhesive layer had a thickness of 3 μm, and a base material layer composed of a biaxially stretched nylon film (thickness: 25 μm) was then laminated by a dry lamination method to prepare a laminate of the base material layer, the adhesive layer, the metal foil layer (not subjected to a chromate treatment) and the acid reaction resin layer.

Carboxylic acid-modified polypropylene (disposed on the metal foil layer side; thickness: 23 μm) and homopolypropylene (innermost layer; thickness: 23 μm) were then co-extruded onto the acid reaction resin layer of the laminate to laminate on the metal foil layer a sealant layer including two layers. Thus, a battery packaging material including a laminate with the base material layer, the adhesive layer, the metal foil layer (not subjected to a chromate treatment), the acid reaction resin layer and the sealant layer laminated in this order was obtained.

Examples 8A to 14A

A battery packaging material including a laminate with a base material layer, an adhesive layer, a metal foil layer (subjected to a chromate treatment), an acid reaction resin layer and a sealant layer laminated in this order was produced under the same conditions as in Example 1A except that a metal foil layer composed of an aluminum foil (thickness: 40 μm) with both surfaces subjected to a chromate treatment was used. The chromate treatment was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher. The thickness (thickness on one side) of an-acid resistance film formed by the chromate treatment was 0.005 μm.

Comparative Example 1A

A battery packaging material including a laminate with a base material layer, an adhesive layer, a metal foil layer (not subjected to a chromate treatment) and a sealant layer laminated in this order was produced under the same conditions as in Example 1A except that an acid reaction resin layer was not provided.

Comparative Example 2A

A battery packaging material including a laminate with a base material layer, an adhesive layer, a metal foil layer (subjected to a chromate treatment) and a sealant layer laminated in this order was produced under the same conditions as in Example 8A except that an acid reaction resin layer was not provided.

2-1. Evaluation of Battery Packaging Material of First Aspect of Invention

<Evaluation of Electrolytic Solution Resistance>

Each of the battery packaging materials was cut to a size of 60 mm (MD direction, longitudinal direction)×150 mm (TD direction, lateral direction). Next, the cut battery packaging material was folded in half with two parts of the sealant layer facing each other in the TD direction, and heat-welded on one side of the sides facing each other in the TD direction and on one side in the MD direction to prepare a bag-shaped battery packaging material opened at one side in the TD direction. As conditions for heat-welding, the temperature was 190° C., the surface pressure was 1.0 MPa, and the heating and pressurization time was 3 seconds. Next, 3 g of an electrolytic solution was injected from the opening, and the opening was heat-welded at a width of 7 mm under the same conditions as described above. The electrolytic solution was obtained by mixing lithium phosphate hexafluoride with a solution formed by mixing ethylene carbonate, diethyl carbonate and dimethyl carbonate at a volume ratio of 1:1:1. Next, the battery packaging material was left standing in a thermostatic bath at 85° C. for 24 hours while a part of the battery packaging material where the opening was situated faced upward.

Next, each battery packaging material was taken out from the thermostatic bath, and the battery packaging material was unsealed to remove the electrolytic solution. Thereafter, the folded part of the battery packaging material was cut to a strip with a width of 15 mm to obtain a test piece. The sealant layer and the metal layer of the obtained test piece were drawn at a speed of 50 mm/minute using a tensile tester (AGS-50D (trade name) manufactured by Shimadzu Corporation), and the peeling strength (N/15 mm) of the test piece was measured (peeling strength after durability test). For a test piece obtained by cutting the battery packaging material to a width of 15 mm, the peeling strength was measured (peeling strength before durability test) in the same manner as described above. From the obtained value of peeling strength before and after the durability test, the peeling strength residual ratio (%) was calculated in accordance with the following equation.

Peeling strength residual ratio (%)=(peeling strength after durability test/peeling strength before durability test)×100

<Evaluation of Insulation Quality Against Very Small Caught Contaminants>

The battery packaging material was cut to a size of 40 mm (width)×100 mm (length) to obtain a test piece. Next, the test piece was folded with the short sides facing each other, and disposed in such a manner that the surfaces of two parts of the sealant layer of the test piece faced each other. Next, a wire of 25 μmφ was inserted between the mutually facing surfaces of the sealant layer. Next, in this state, the two parts of the sealant layer were heat-sealed with each other in a direction orthogonal to the length direction of the battery packaging material using a heat sealer including a flat heat plate having a width of 7 mm on both upper and lower sides (heat sealing conditions: 190° C., 1.0 MPa). Next, a terminal of a tester was connected to each of the surfaces of the base material layer on both sides in such a manner that a part of the battery packaging material where the wire was inserted was situated at the center. Next, a voltage of 100 V was applied between the testers, and a time (second) until a short circuit occurred was measured.

<Evaluation Results>

The obtained results are shown in Table 1A. From the results, it has been confirmed that by providing an acid reaction resin layer between the metal foil layer and the sealant layer, electrolytic solution resistance, and an insulation quality against very small caught contaminants are dramatically improved. Further, it has become evident that by providing an acid reaction resin layer having a thickness of 0.01 μm or more, especially 1 μm or more, and using a metal foil layer subjected to a chromate treatment, further excellent electrolytic solution resistance is exhibited.

TABLE 1A

| | Chromate treatment in metal foil layer | Thickness of acid reaction resin layer (μm) | Evaluation of electrolytic solution resistance (peeling strength residual ratio) | Evaluation of insulation quality against very small caught contaminants (time until occurrence of short-circuit) |
|---|---|---|---|---|
| Example 1A | Not done | 0.008 | 85% | 1 |
| Example 2A | Not done | 0.011 | 85% | 6 |
| Example 3A | Not done | 0.9 | 85% | 12 |
| Example 4A | Not done | 1.1 | 85% | 16 |
| Example 5A | Not done | 2.9 | 85% | 43 |
| Example 6A | Not done | 3.1 | 85% | 45 |
| Example 7A | Not done | 5.0 | 85% | 45 |
| Example 8A | Not done | 0.008 | 95% | 1 |
| Example 9A | Not done | 0.011 | 95% | 6 |
| Example 10A | Not done | 0.9 | 95% | 12 |
| Example 11A | Not done | 1.1 | 95% | 16 |
| Example 12A | Not done | 2.9 | 95% | 43 |
| Example 13A | Not done | 3.1 | 95% | 45 |
| Example 14A | Done | 5.0 | 95% | 45 |
| Comparative Example 1A | Not done | — | 0% | 1 |
| Comparative Example 2A | Done | — | 95% | 1 |

1-2. Production of Battery Packaging Material of Second Aspect of Invention Examples 1B to 11B and Comparative Example 1B To one of the surfaces of a metal foil layer composed of an aluminum foil (thickness: 40 μm) which had not been subjected to a chromate treatment, an adhesive layer composed of a two-liquid urethane adhesive agent including a polyester-based main agent and an isocyanate-based curing agent was applied so as to have a thickness of 3 μm, and a base material layer composed of a biaxially stretched nylon film (thickness: 25 μm) was then laminated by a dry lamination method to prepare a laminate of the base material layer, the adhesive layer and the metal foil layer (not subjected to a chromate treatment).

A sealant layer including two layers was then laminated on the metal foil layer by co-extruding a sealant layer resin composition 1 (disposed on the metal foil layer side) and a sealant layer resin composition 2 (innermost layer) as shown below in such a manner that these two layers each had a thickness of 23 μm. Thereafter, a heating treatment was performed at 190° C. for 3 seconds. Thus, a battery packaging material including a laminate with the base material layer, the adhesive layer, the metal foil layer (not subjected to a chromate treatment) and the two sealant layers laminated in this order was obtained.

<Sealant Layer Resin Composition 1>
  Carboxylic acid-modified polypropylene (heat-weldable resin) 100 parts by mass
  Urea-modified furan resin (HP 6200N, manufactured by ASAHI YUKIZAI CORPORATION) predetermined amount shown in Table 1B
<Sealant Layer Resin Composition 2>
  Homopolypropylene (heat-weldable resin) 100 parts by mass
  Urea-modified furan resin (HP 6200N, manufactured by ASAHI YUKIZAI CORPORATION) predetermined amount shown in Table 1B Examples 12B to 22B and Comparative Example 2B A battery packaging material including a laminate with a base material layer, an adhesive layer, a metal foil layer (subjected to a chromate treatment) and two sealant layers laminated in this order was produced under the same conditions as in Example 1B except that a metal foil layer composed of an aluminum foil (thickness: 40 μm) with both surfaces subjected to a chromate treatment was used. The chromate treatment was performed by applying to both the surfaces of the aluminum foil a treatment liquid including a phenol resin, a chromium fluoride compound and phosphoric acid using a roll coating method in such a manner that the application amount of chromium was 10 mg/m² (dry weight), and performing baking for 20 seconds under such conditions that the film temperature was 180° C. or higher. The thickness (thickness on one side) of an-acid resistance film formed by the chromate treatment was 0.005 μm.

2-2. Evaluation of Battery Packaging Material of Second Aspect of Invention
<Evaluation of Electrolytic Solution Resistance>

Each of the battery packaging materials was cut to a size of 60 mm (MD direction, longitudinal direction)×150 mm (TD direction, lateral direction). Next, the cut battery packaging material was folded in half with two parts of the sealant layer facing each other in the TD direction, and heat-welded on one side of the sides facing each other in the TD direction and on one side in the MD direction to prepare a bag-shaped battery packaging material opened at one side in the TD direction. As conditions for heat-welding, the temperature was 190° C., the surface pressure was 1.0 MPa, and the heating and pressurization time was 3 seconds. Next, 3 g of an electrolytic solution was injected from the opening, and the opening was heat-welded at a width of 7 mm under the same conditions as described above. The electrolytic solution was obtained by mixing lithium phosphate hexafluoride with a solution formed by mixing ethylene carbonate, diethyl carbonate and dimethyl carbonate at a volume ratio of 1:1:1. Next, the battery packaging material was left standing in a thermostatic bath at 85° C. for 24 hours while a part of the battery packaging material where the opening was situated faced upward.

Next, each battery packaging material was taken out from the thermostatic bath, and the battery packaging material was unsealed to remove the electrolytic solution. Thereafter, the folded part of the battery packaging material was cut to a strip with a width of 15 mm to obtain a test piece. The sealant layer and the metal layer of the obtained test piece were drawn at a speed of 50 mm/minute using a tensile tester (AGS-50D (trade name) manufactured by Shimadzu Corporation), and the peeling strength (N/15 mm) of the test piece was measured (peeling strength after durability test). For a test piece obtained by cutting the battery packaging material to a width of 15 mm, the peeling strength was measured (peeling strength before durability test) in the same manner as described above. From the obtained value of peeling strength before and after the durability test, the peeling strength residual ratio (%) was calculated in accordance with the following equation.

Peeling strength residual ratio (%)=(peeling strength after durability test/peeling strength before durability test)×100

<Peeling Strength Before Durability Test>

The peeling strength (N/15 mm) of the battery packaging material of Comparative Example 1B before the durability test was set to 100%, the relative value (%) of peeling strength of each battery packaging material before the durability test was calculated.

<Evaluation of Insulation Quality Against Very Small Caught Contaminants>

The battery packaging material was cut to a size of 40 mm (width)×100 mm (length) to obtain a test piece. Next, the test piece was folded with the short sides facing each other, and disposed in such a manner that the surfaces of two parts of the sealant layer of the test piece faced each other. Next, a wire of 25 μmφ was inserted between the mutually facing surfaces of the sealant layer. Next, in this state, the two parts of the sealant layer were heat-sealed with each other in a direction orthogonal to the length direction of the battery packaging material using a heat sealer including a flat heat plate having a width of 7 mm on both upper and lower sides (heat sealing conditions: 190° C., 1.0 MPa). Next, a terminal of a tester was connected to each of the surfaces of the base material layer on both sides in such a manner that a part of the battery packaging material where the wire was inserted was situated at the center. Next, a voltage of 100 V was applied between the testers, and a time (second) until a short circuit occurred was measured.

<Evaluation Results>

The obtained results are shown in Table 1B. From the results, it has been confirmed that by forming the sealant layer using a heat-weldable resin and an acid-curable resin, electrolytic solution resistance, and an insulation quality against very small caught contaminants are dramatically improved. Further, it has become evident that by using a sealant layer containing a heat-weldable resin and an acid-curable resin, and a metal foil layer subjected to a chromate treatment, further excellent electrolytic solution resistance is exhibited. Even when a heat-weldable resin and an acid-curable resin coexisted in the sealant layer, sufficient sealing strength was exhibited.

TABLE 1B

| | Chromate treatment in metal foil layer | Amount (parts by mass) of urea-modified furan resin based on 100 parts by mass of heat-weldable resin in sealant layer resin compositions 1 and 2 | Evaluation of electrolytic solution resistance (peeling strength residual ratio) | Evaluation of insulation quality against very small caught contaminants (time until occurrence of short-circuit) | Sealing strength (relative value of peeling strength before durability test; %) |
|---|---|---|---|---|---|
| Example 1B | Not done | 0.11 | 85% | 5 | 100 |
| Example 2B | Not done | 0.9 | 85% | 18 | 100 |
| Example 3B | Not done | 1.1 | 85% | 23 | 100 |
| Example 4B | Not done | 1.9 | 85% | 43 | 100 |
| Example 5B | Not done | 2.1 | 85% | 50 | 100 |
| Example 6B | Not done | 14.9 | 85% | 52 | 100 |
| Example 7B | Not done | 15.1 | 85% | 53 | 100 |
| Example 8B | Not done | 19.9 | 85% | 53 | 100 |
| Example 9B | Not done | 20.1 | 85% | 53 | 100 |
| Example 10B | Not done | 29.9 | 85% | 53 | 100 |
| Example 11B | Not done | 35.0 | 85% | 53 | 80 |
| Example 12B | Done | 0.11 | 95% | 5 | 100 |
| Example 13B | Done | 0.9 | 95% | 18 | 100 |
| Example 14B | Done | 1.1 | 95% | 23 | 100 |
| Example 15B | Done | 1.9 | 95% | 43 | 100 |
| Example 16B | Done | 2.1 | 95% | 50 | 100 |
| Example 17B | Done | 14.9 | 95% | 52 | 100 |
| Example 18B | Done | 15.1 | 95% | 53 | 100 |
| Example 19B | Done | 19.9 | 95% | 53 | 100 |
| Example 20B | Done | 20.1 | 95% | 53 | 100 |
| Example 21B | Done | 29.9 | 95% | 53 | 100 |
| Example 22B | Done | 35.0 | 95% | 53 | 80 |
| Comparative Example 1B | Not done | 0 | 0% | 1 | 100 |
| Comparative Example 2B | Done | 0 | 95% | 1 | 80 |

In all examples, the amount (parts by mass) of the urea-modified furan resin based on 100 parts by mass of the heat-weldable resin in the sealant layer resin composition 1 is equal to the amount (parts by mass) of the urea-modified furan resin based on 100 parts by mass of the heat-weldable resin in the sealant layer resin composition 2. Specifically, in Example 1B, the sealant layer resin composition 1 contains 0.11 parts by mass of the urea-modified furan resin based on 100 parts by mass of carboxylic acid-modified polypropylene, and the sealant layer resin composition 2 contains 0.11 parts by mass of the urea-modified furan resin based on 100 parts by mass of homopolypropylene.

DESCRIPTION OF REFERENCE SIGNS

1: Base material layer
2: Adhesive layer
3: Metal foil layer
4: Sealant layer
5: Acid reaction resin layer

The invention claimed is:

1. A battery packaging material comprising a laminate including at least a base material layer, an adhesive layer, a metal foil layer and a sealant layer in this order, the battery packaging material including an acid reaction resin layer between the adhesive layer and the metal foil layer and/or between the metal foil layer and the sealant layer, the acid reaction resin layer containing an acid-curable resin.

2. The battery packaging material according to claim 1, wherein the acid reaction resin layer is provided at least between the metal foil layer and the sealant layer.

3. The battery packaging material according to claim 1, wherein the acid reaction resin layer has a thickness of 0.01 μm or more.

4. The battery packaging material according to claim 1, wherein the acid-curable resin includes an acid-curable furan resin and/or an acid-curable phenol resin.

5. The battery packaging material according to claim 1, wherein the metal foil layer is an aluminum foil.

6. A battery comprising a battery element which includes at least a positive electrode, a negative electrode and an electrolyte, the battery element being stored in the battery packaging material according to claim 1.

7. A battery packaging material which comprises a laminate including at least a base material layer, an adhesive layer, a metal foil layer and a sealant layer in this order, the sealant layer containing a heat-weldable resin and an acid-curable resin.

8. The battery packaging material according to claim 7, wherein the sealant layer contains 0.1 to 35 parts by mass of the acid-curable resin based on 100 parts by mass of the heat-weldable resin.

9. A method for producing a battery packaging material, the method comprising:
   a first step of forming a laminate in which an acid reaction resin layer containing an acid-curable resin is laminated on at least one of surfaces of a metal foil layer;
   a second step of forming a laminate in which a base material layer is laminated on the laminate obtained in the first step with an adhesive layer interposed therebetween; and
   a third step of laminating a sealant layer to a surface of the laminate obtained in the second step on a side opposite to the base material layer of the laminate obtained in the second step.

10. A method for producing a battery packaging material, the method comprising:
   a first step of forming a laminate in which a base material layer is laminated on a metal foil layer with an adhesive layer interposed therebetween; and a second step of laminating a sealant layer to a surface of the laminate obtained in the first step on a side opposite to the base material layer of the laminate obtained in the first step, the sealant layer containing a heat-weldable resin and an acid-curable resin.

* * * * *